D. N. SMITH.
Stove Stand.
No. 97,321. Patented Nov. 30, 1869.
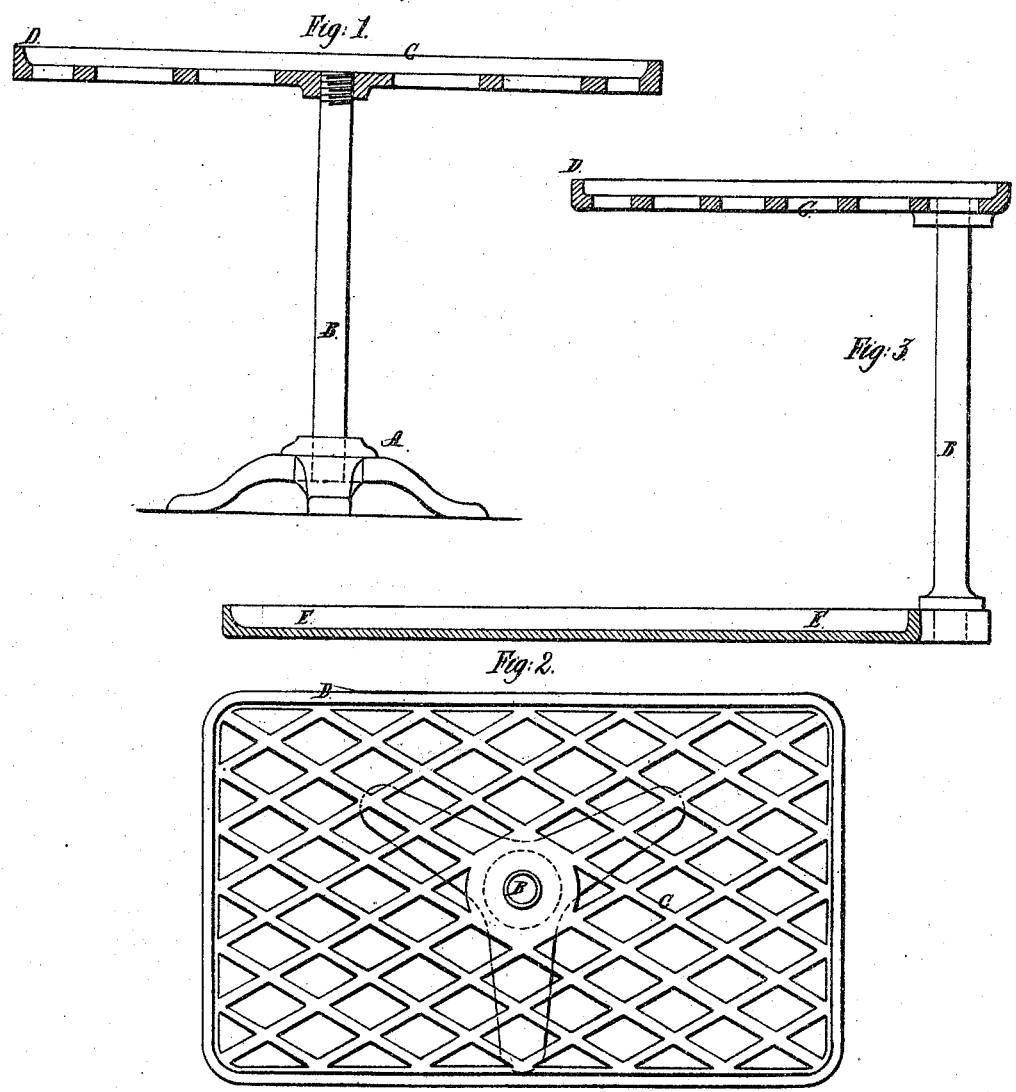

United States Patent Office.

D. N. SMITH, OF BOSTON, MASSACHUSETTS.

Letters Patent No. 97,321, dated November 30, 1869; antedated November 27, 1869.

IMPROVED STOVE-STAND.

The Schedule referred to in these Letters Patent and making part of the same.

*To all whom it may concern:*

Be it known that I, D. N. SMITH, of Boston, in the county of Suffolk, and State of Massachusetts, have invented a Stove-Stand; and I do hereby declare that the following is a full, clear, and exact description thereof, reference being had to the accompanying drawing, and to the letters of reference marked thereon.

The nature of my invention consists in supplying the kitchen with suitable stands, made of iron, or any other suitable metal, to be placed on the stove, for the purpose of exposing different things to the radiating-heat of the stove, without bringing them in direct contact with the heated plates, which heat would be too intense for that purpose.

Say, for instance, such stands could be used for keeping dishes warm, before putting them on the table; for setting warm the pan for raising bread or cake; for drying pans above the stove, before putting them away, &c.

The stand is so constructed that it will stand firm on the stove; a rod, of suitable length, with a foot and a top plate; the top plate is cast with a border all around, and the plate itself perforated or open, so that the heat from the stove can freely circulate through the holes in the plate under the bottom of anything that may be placed on top the plate to be warmed or kept warm.

One special service of such a stand must be noted here; that is, its combination with the griddle.

On one side of the griddle is cast on, an ear, to receive the rod of the stand.

The platform is to project over the griddle, to hold the plate, which is to receive the cakes baked on the griddle, the importance of which will be seen immediately, and every kitchen is to have such a griddle, with plate-holder.

Figure 1 is a side view of the stand.

Figure 2 is a plan of it.

Figure 3 represents a combination of the griddle with such a stand, as a plate-holder.

A is the foot.

B, the rod, which can be made of different lengths for the same foot and top plate.

C is the top plate, which is cast perforated or open, in any plain or fancy style, with a border, D, around its edge.

E represents the griddle, in combination with a platform, C, and rod, B.

What I claim, and desire to secure by Letters Patent, is—

The griddle E, with rod B, and platform C D; and foot A, for the purpose as specified.

D. N. SMITH.

Witnesses:
THOMAS GEORGE,
JAMES C. GERARD.